United States Patent [19]
Takada

[11] 3,834,496
[45] Sept. 10, 1974

[54] VEHICLE SAFETY DEVICE
[75] Inventor: Takezo Takada, Hikone, Japan
[73] Assignee: Takata Kojyo Co. Ltc., Tokyo, Japan
[22] Filed: Sept. 1, 1972
[21] Appl. No.: 285,718

[30] Foreign Application Priority Data
Sept. 18, 1971 Japan.............................. 46-70327

[52] U.S. Cl................................ 188/136, 188/188
[51] Int. Cl............................................. F16d 59/00
[58] Field of Search.... 188/64, 65.1, 65.4, 135–137, 188/182, 188, 189; 242/156.1

[56] References Cited
UNITED STATES PATENTS

| | | | |
|---|---|---|---|
| 3,143,192 | 8/1964 | Buchanan | 188/65.1 |
| 3,237,729 | 3/1966 | Proctor | 188/136 |
| 3,240,510 | 3/1966 | Spouge | 188/188 UX |
| 3,250,348 | 5/1966 | Moyer | 188/188 |

*Primary Examiner*—Duane A. Reger
*Attorney, Agent, or Firm*—Wolder & Gross

[57] ABSTRACT

A vehicle passenger restraining belt extends from a retraction reel and one or both opposite faces of the belt are frictionally engaged by respective brake members which are swingable about transverse axis. The brake member has a curved friction brake face spaced from its swing axis distances which increase in a direction opposite to the belt withdrawal direction. As a withdrawal force is applied to the belt its withdrawal is frictionally prevented by the brake member and with increased force the brake member is advanced to retract its point of engagement with the belt to increase the angle between a line extending perpendicularly to the belt from the brake member axis and a line between the axis and the point of engagement until such angle exceeds a predetermined angle whose tangent equals the coefficient of friction between the brake and belt faces and the belt slips along the brake with the kinetic energy of the passenger being absorbed. The brake is normally disabled by a solenoid which is energized through a series of connected inertia switch, a manually actuated switch and a seat occupation actuated switch.

7 Claims, 12 Drawing Figures

VEHICLE SAFETY DEVICE

BACKGROUND OF THE INVENTION

The present invention relates generally to improvements in vehicle safety devices and it relates particularly to an improved passenger restraining safety belt system.

In the conventional vehicle safety belt system the passenger is restrained in his seat by a positively locked safety belt of an adjustable fixed length whereby to prevent the passenger from striking an internal surface of the vehicle upon rapid deacceleration of the vehicle. While this system may prevent impact with a vehicle surface it does not absorb the passengers kinetic energy with consequent injury to the passenger due to his physical reactions. Many arrangements have been proposed for absorbing the passengers kinetic energy attendant to a collision but these arrangements possess numerous drawbacks. They are generally unreliable and of little adaptability and flexibility and otherwise leave much to be desired.

SUMMARY OF THE INVENTION

It is a principal object of the present invention to provide an improved vehicle safety device.

Another object of the present invention is to provide an improved vehicle passenger safety restraining system.

Still another object of the present invention is to provide an improved passenger safety belt system which absorbs the kinetic energy of the passenger attendant to a rapid deacceleration of the vehicle.

A further object of the present invention is to provide a system of the above nature characterized by its reliability, ruggedness, simplicity and versatility.

The above and other objects of the present invention will become apparent from a reading of the following description taken in conjunction with the accompanying drawings which illustrate preferred embodiments thereof.

In a sense the present invention contemplates the provision of a vehicle safety belt mechanism comprising a safety belt advanceable along a predetermined path under the influence of a withdrawal force on said belt, and means for preventing the advance of the belt under a withdrawal force less than a predetermined value and permitting the withdrawal of the belt against a predetermined load when the withdrawal force exceeds said predetermined value including a braking member having a brake face frictionally engaging a face of the belt along said path to frictionally inhibit the advance of the belt when said withdrawal force is less than the frictional restraining force between the belt and brake faces and to permit the advance of the belt against said frictional restraining force when exceeded by said withdrawal force.

In the preferred form of the present system the restraining belt extends from a retraction reel and a brake member is supported for swinging about a transverse axis on one of both sides of the belt. The frictional brake surface extends across the belt face and is curved with the distance between the brake surface and brake axis decreasing in the direction of belt withdrawal. Thus as a withdrawal force is applied to the belt it is restrained from advance by the frictional engagement by the brake member, the initial point of maximum engagement between the brake surface and the belt moving rearwardly with the forward swinging of the brake member consequent to increased belt withdrawal force. Thus the angle between a line extending perpendicularly from the brake member axis to the belt face and a line extending from the axis to the engagement point between the brake surface and belt face increases with increases in the belt withdrawal force until it exceeds a predetermined value which is a function of the coefficient of friction between the brake and belt faces at which point the belt slips along the brake face and absorbs the passenger kinetic energy causing the belt withdrawal force. The parameters, particularly the coefficient of friction between the belt and brake surfaces are adjusted so that the critical angle, that is the angle whose tangent equals the coefficient of friction between the belt and brake surfaces is exceeded and belt slippage occurs when the force on the belt is at a desired value, for example between 300 and 3,000 kilograms, advantangeously between 500 and 1,500 kilograms, preferably between 700 and 1,000 kilograms.

A mechanism is provided for actuating the brake only under certain vehicle conditions, that is rapid changes in velocity or changes in inclination and includes a solenoid which when energized effects disabling of the brake mechanism and which is connected through a normally closed inertia switch to a battery. Switches actuated manually and by the occupation of the vehicle seat also control the solenoid energization.

The improved safety belt mechanism is highly reliable and versatile and adaptable and is very simple and rugged.

DESCRIPTION OF THE PREFERRED EMBODIMENTS

The belt lock system characterizing the present invention possesses the feature that it permits the belt to slip when the tension on the belt reaches predetermined value, (for example, about 100kg for a waist belt and about 700kg for a shoulder belt), before the tension on the belt reaches a dangerous level, holding a predetermined load. Therefore, it is possible with the present system for the belt means to achieve an almost ideal tension elongation response. Namely, while the conventional belt means provides for a high maximum load as indicated by D in FIG. 1, a small energy absorption as indicated by the curve ODE in FIG. 1, the belt brake means according to the present invention is characterized in that it assures a low maximum load, indicated by A in FIG. 1, and large energy absorption as indicated by the curve OABC in FIG. 1.

Figure 2:
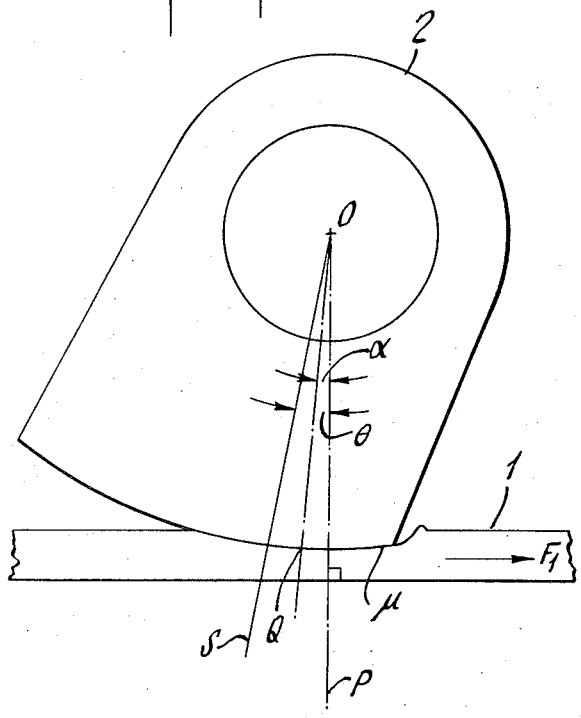
FIG. 2 is a front elevational view of a braking element and belt embodying the present invention shown in a belt locked condition.
Figure 3:
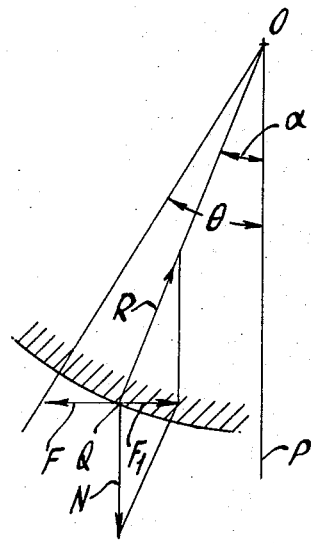
FIG. 3 is a vector diagram of the forces effected by the system shown in FIG. 2.

Referring to FIGS. 2 to 7, the reference numeral 1 generally designates a seat belt which extends from a take-up reel and is braked by a swingable brake member 2 whose action and construction are most important in the seat belt means according to the present invention. The principle of operation of the seat belt mechanism will be explained, to begin with, with reference to FIGS. 2 to 7, FIGS. 2 and 3 showing the seat belt in locked condition and FIG. 3 indicating the action of forces on a passenger held by the locked belt. In FIG. 3, $F_1$ is the tension on the belt 1, R is the component of force of $F_1$ in the direction toward the center or axis of swing of the brake 2 and N is the component of force of $F_1$ in the direction vertical to the belt 1, that is the pressure normal to the belt 1. Assuming that F is a maximum frictional force due to N, and $\mu$ is the static maximum coefficient of friction between the contact surfaces of the brake 2 and the belt 1, the relation between $\mu$ and N can be expressed by the following equation:

$$F = \mu N \tag{1}$$

When a static friction angle is expressed by $\theta$ (<POS), the above relation can be also expressed by the following equation 2:

$$F = \tan\theta . N \tag{2}$$

It is clear from FIG. 3 that $$F_1/N = \tan\alpha, \text{ or } N = F_1/\tan\alpha \tag{3}$$

When N in equation 2 is substituted by equation 3, the equation $F/F_1 = \tan\theta/\tan\alpha$ is obtained.

Accordingly, when $\theta$ is larger than $\alpha$, that is $\tan\theta/\tan\alpha$ is larger than 1, F, the maximum frictional force due to N is larger than $F_1$, the tension on the belt, whereby the seat belt 1 is kept under locked condition (as shown in FIG. 2).

Figure 4:
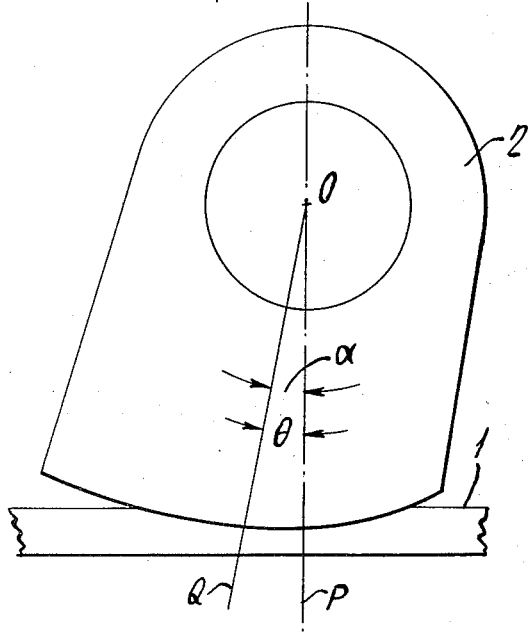
FIG. 4 is a view similar to FIG. 2 with the belt at the point between locked and slipping conditions.
Figure 5:
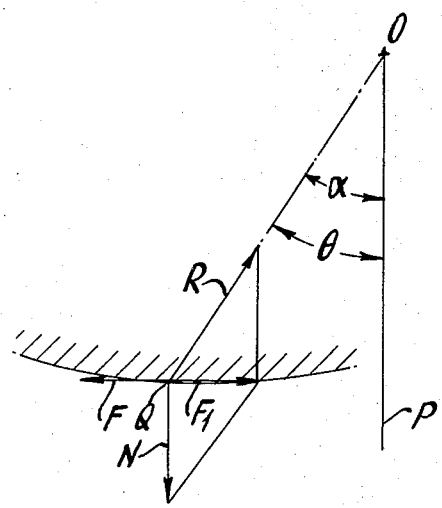
FIG. 5 is a view similar to FIG. 3 with the system in the condition of FIG. 4.
Figure 6:
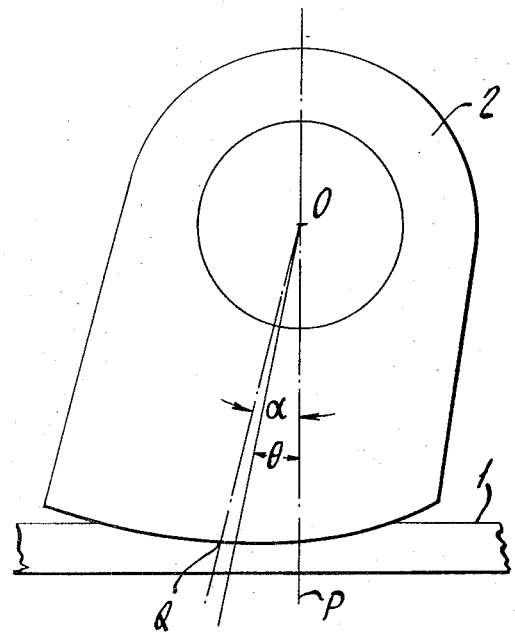
FIG. 6 is a view similar to FIG. 2 with the belt in slipping condition.
Figure 7:
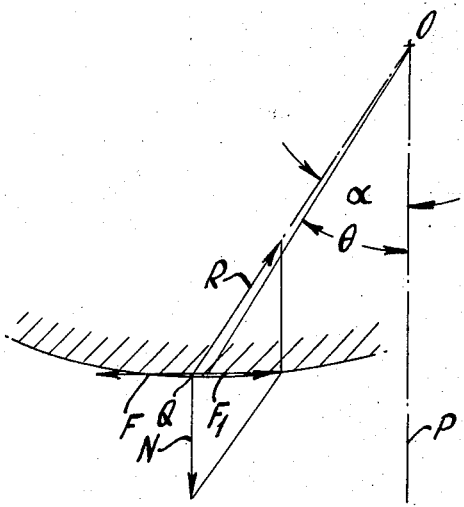
FIG. 7 is a view similar to FIG. 3 with the system in the condition of FIG. 6.
Figure 8:
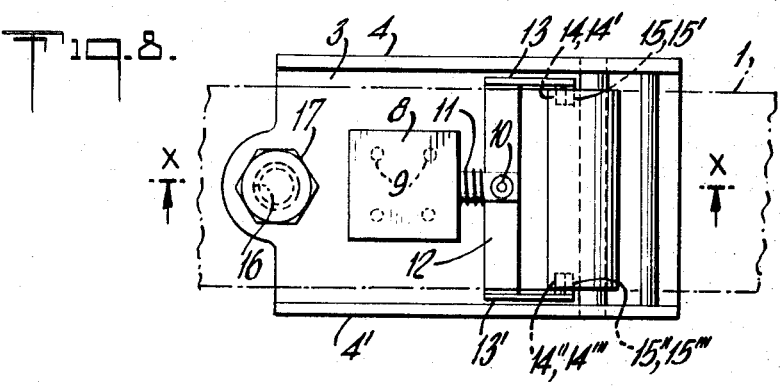
FIG. 8 is a top plan view of a braking system embodying the present invention.
Figure 9:
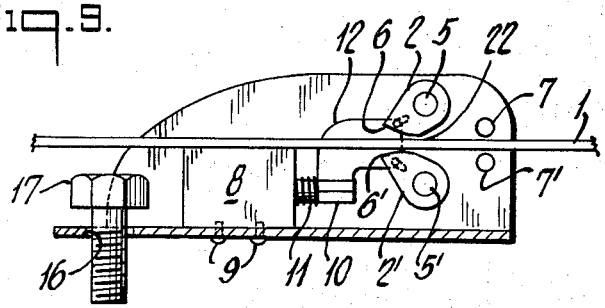
FIG. 9 is a sectional view along line $x - x$ in FIG. 8 with the brake shown in a disabled condition.

As shown in FIGS. 4 and 5, when angle $\theta$ equals angle $\alpha$, that is, when F equals $F_1$, the restraining force F due to friction is just equal to the tension on the belt, $F_1$. When $F_1$ the tension on the belt becomes larger than the above value, as shown in FIGS. 6 and 7, and angle $\alpha$ exceeds angle $\theta$, F becomes smaller than $F_1$, and the belt is permitted to slip.

Figure 1:
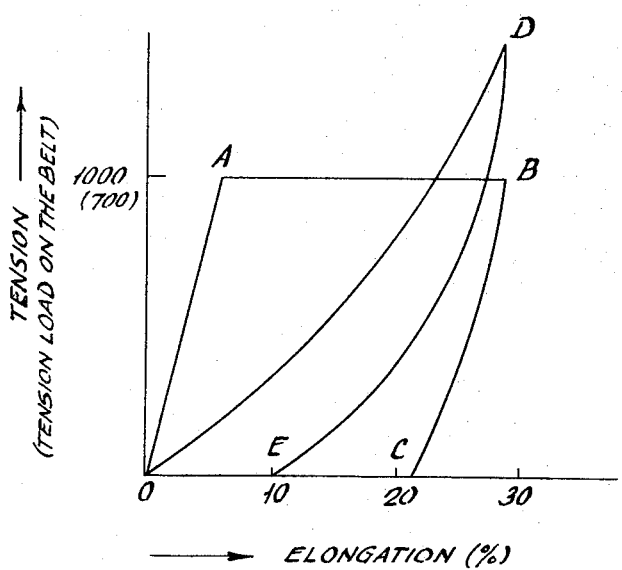
FIG. 1 is a graph illustrating the tension elongation characteristics of a conventional safety belt and one embodying the present invention.

More particularly, the cam shaped brake 2 according to the present invention has a curved frictional brake face whose distance from the swing axis increases in a direction opposite to the belt withdrawal direction and first comes into contact with the belt, then swings to displace its angle against the belt in response to the tension on the belt, $F_1$. FIG. 2 shows the intermediate situation between the first and second conditions in which case angle $\theta$ is larger than angle $\alpha$. On the other hand, when the brake 2 revolves to change its angle against the belt further, the pressure point moves due to the shape of the brake face in the opposite direction relative to its revolution. Under this condition, $\theta$ becomes equal to $\alpha$, as shown in FIG. 4, and the tension on the belt reaches its maximum (the point A in FIG. 1). If the above predetermined maximum tension on the belt in the above case is large, the belt can be used as the conventional lock means of seat belt (indicated by the curve ODE), as shown in FIG. 1. If on the contrary, such predetermined maximum tension is small, kinetic energy due to an accident and the like can be absorbed, as shown by the curve OABC in FIG. 1. In other words, when the tension on the belt becomes larger the maximum load indicated by the point A is reached as the brake rotates and the pressure point moves further to the left. As a result, the pressure angle $\alpha$ becomes larger than the maximum static friction angle $\theta$, the belt begins to slip, as shown in FIG. 6. In this case, the belt slips as indicated by the curve AB in FIG. 1, keeping the tension on the belt F to approximate maximum load value. Under this condition, the tension elongation characteristics of the belt shows ideal curve OABC, absorbing 80% or more of the kinetic energy of the passengers and holding them in their seats. Therefore, the seat belt brake system according to the present invention provides maximum safety to the passengers and can be used repeatedly in the same condition.

Figure 10:
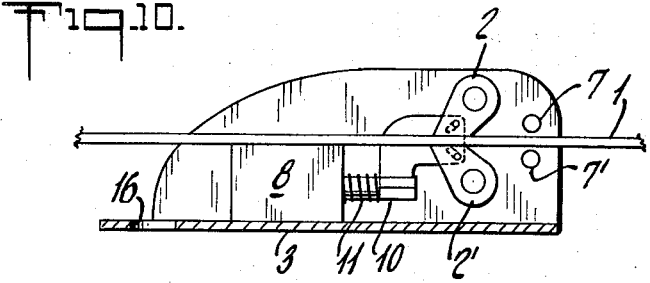
FIG. 10 is a view similar to FIG. 9 with the brake actuated.
Figure 11:
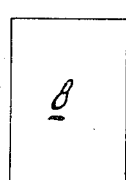
FIG. 11 is a circuit diagram of the brake actuating network.
Figure 11:
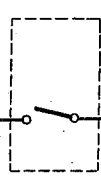
Figure 11:
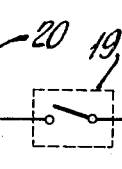
Figure 11:
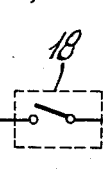
Figure 11:
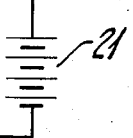

Referring to the first embodiment of the present invention shown in FIGS. 8 to 11. The safety belt 1 which advantageously extends from any suitable retractor is guided between the flanges 4 and 4' of the channel or U-shaped frame or bracket 3 having a base and side flanges and similar cam-shaped brakes 2 and 2' as earlier described are rotatably mounted symmetrically with the belt 1 therebetween by means of the opposite transverse pins 5 and 5'. The contact or friction brake surfaces 6 and 6' of the brakes 2 and 2' are roughly finished by a kurling tool, etc. to increase the frictional coefficient against the belt 1. To control the stretching or movement direction of the belt 1, guide pins 7 and 7' are positioned to the right of the brakes 2 and 2'. A solenoid 8 is secured in the center of the base of frame 3 by means of screws 9. A transverse locking element 12 is mounted on the armature or shaft 10 of the solenoid 8 which is outwardly biased by a coil spring 11. The opposite ends of the locking element are bent to form forwardly directed side arms or flanges 13 and 13', and claws 14, 14', 14'' and 14''' are formed near the ends of the flanges 13 and 13' and engage grooves 15, 15', 15'' and 15''' formed in the opposite end faces of the brakes 2 and 2' in order to couple the solenoid 8 to the brakes 2 and 2'. The frame 3 is secured or anchored to the vehicle by means of a bolt 17 engaging a hole 17 in the bracket base rear of the solenoid 8. The solenoid 8 is connected to a power supply battery 21 through the series connected manual switch 18, seat occupation responsive switch 19 to detect the seating of the passenger and the shock sensitive means or inertia switch 20 mounted on the vehicle, etc. as shown in FIG. 11.

The operation of the first embodiment will be explained with reference to FIGS. 8 to 11. When a passenger occupies a seat, the respective seat switch 19 closes and upon closing of the manual switch 18, the current flows through the solenoid 8 by way of the normally closed inertia switch 20 to attract the shaft 10. As a result, the coil spring 11 is compressed and the locking element 12 is pulled to the left, so that the brake 2 and the brake 2' rotate clockwise and counterclockwise respectively to make the space 22 between the stoppers 2 and 2' wider than the thickness of the belt 1. Therefore, the belt 1 can be freely withdrawn by the motion of the passengers. However, on the collision or lateral turning of the vehicle or other emergencies, the shock responsive means or switch 20 operates and cuts off the current through the solenoid, so the solenoid 8 releases the shaft 10 and the locking element 12 snaps back to the right. Accordingly, the brake 2 and the brake 2' rotate counterclockwise and clockwise respectively to bring the rough contact or brake surfaces 6 and 6' into contact with the surface of the belt 1 for the purpose of frictionally engaging the belt. Then as the belt 1 is pulled out by the motion of the passengers, the brakes 2 and 2' bite in the belt to hold the belt 1 strongly therebetween, and the belt 1 is secured by the frictional force caused by such strong holding effect. (FIG. 10). When the tension of the belt exceeds the predetermined load value as explained above, the belt begins to slip to absorb the kinetic energy of the passengers. Generally speaking, the highest predetermined values for the tensions on a waist belt and a shoulder belt are about 1,000 kg and 700 kg respectively. In emergencies, an emergency brake is applied and there is no damage in a vehicle body, the shock responsive means 20 turns off immediately and the belt returns to its normal condition.

Figure 12:
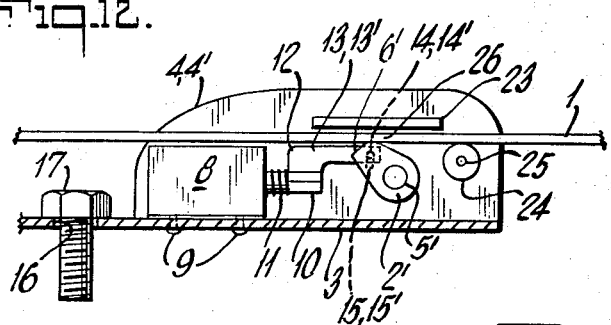
FIG. 12 is a view similar to FIG. 9 of another embodiment of the present invention.

Another embodiment of the present invention functioning in the manner earlier described as illustrated in FIG. 12, in which the belt 1 is guided between the flanges 4 and 4' of the channel or U-shaped frame 3. A lock plate 23 is mounted above the belt 1 and the brake 2' as earlier described is mounted rotatably under the belt 1 by means of the pin 5'. In this case, the brake 2' is so constituted and shaped that its frictional force may be established larger than the maximum load valve of the tension on the belt, 2,000kg. The frictional brake surface 6' of the brake 2' engageable with the surface of the belt 1 is roughed by a kurling tool, etc. to increase the frictional coefficient therebetween.

The guide roller 24 is rotatably mounted by means of the pin 25 at a right hand front position thereof for the purpose of guiding the belt 1.

The solenoid 8 is secured in the center of the frame 3 by means of the screws 9. The interlocking element 12 is mounted on the solenoid armature or shaft 10 of the solenoid and is forwardly biased by the pressed coil spring 11. The both ends of the locking element are bent to form the forwardly extending arms 13 and 13' which are provided with the claws 14 and 14' engaging the grooves 15 and 15', in the opposite end faces of the brake 2' in order to couple the solenoid 8 to the brake 2'. The frame 3 is secured to the vehicle by means of the bolt 17 through the hole 16 bored at the rear of the frame base. The solenoid 8 is connected to the power supply 21 through the manual switch 18, the seat switches 19 and the shock responsive means or inertia switch 20 as shown in FIG. 11.

The operation of the second embodiment will be explained with reference to FIGS. 11 and 12.

When a passenger occupies a seat, the seat switch 19 closes and upon the closing of the manual switch 18, the current flows through the inertia switch 20 and the solenoid 8 to attract the shaft 10. As a result, the coil spring 11 is compressed and the locking element 12 is pulled to the left, so that the brake 2' rotates counterclockwise to make the space 22 between the brake 2' and plate 23 wider than the thickness of the belt 11. Therefore, the belt 1 can be pulled out freely by the motion of the passengers. However, on the collision or lateral turning of the vehicles or other emergencies, the shock responsive means or inertia switch 20 operates and cuts off the current through the solenoid, so the solenoid 8 loses its magnetic attraction and the shaft 10 and the locking element 12 fly back to the right. Accordingly, the brake 2' rotates clockwise to bring the rough frictional contact surface 6' into contact with the surface of the belt 1 for the purpose of frictionally engaging the belt. Then the belt 1 is pulled out by the motion of the passengers, the brake 2' frictionally engages the belt as backed by plate 23 to strongly restrain its withdrawal and the belt 1 is held by the frictional force caused by the lock plate 23.

In the second embodiment, the brake 2' has the same function as that of the conventional lock means (having 1,300 kg-1, 500kg of the maximum load value for the tension on the belt), since the stopper 2' is so shaped that $\theta$ becomes equal to $\alpha$ when the maximum load of the tension on the belt reaches 2,000kg. In addition, when the brake of the first embodiment is replaced by that of the second embodiment, such a brake can be used as an energy absorption lock means immediately. This is one of the advantages of the seat belt brake according to the present invention.

The energy absorption lock means of the seat belt of the first embodiment has the effect to absorb the kinetic energy of the passengers by causing the belt to slip, holding predetermined load without locking the belt anymore, before the tension on the belt becomes dangerous to the passengers. This lock means is very simple in construction but assures the safety of the passengers. The lock means of the seat belt of the second embodiment is also very simple in construction, because this means locks the belt itself. Moreover, different from the conventional roll-up lock means, it can lock the belt at desired positions. Therefore, it has advantages of reduction of the size of a belt housing to a minimum and its applicability to vehicles of any construction.

I claim:

1. A vehicle safety belt mechanism comprising a safety belt advanceable along a predetermined path under the influence of a withdrawal force on said belt by the kinetic energy on an occupant, means for preventing the advance of said belt under a withdrawal force less than a predetermined value and permitting the withdrawal of said belt against a predetermined load when said withdrawal force exceeds said predetermined value including a braking member having a brake face frictionally engaging a face of said belt along said path to frictionally inhibit the advance of said belt when said withdrawal force is less than the frictional restraining force between said belt and brake faces and to permit the advance of said belt against said frictional restraining force when exceeded by said withdrawal force to effect the absorption of at least a portion of said kinetic energy, and means supporting said braking member for rocking about a transverse axis relative said belt face along said predetermined path, said brake face extending across said belt face and being longitudinally curved whereby when said braking member rocks forwardly the point of maximum engagement between said brake face and said belt face moves rearwardly with the increase in said withdrawal force until the angle between a line from said axis to said point of engagement exceeds an angle whose tangent is equal to the coefficient of friction between the brake face and the belt face.

2. The safety belt mechanism of claim 1 including a pair of said brake members disposed on opposite sides of said belt.

3. The safety belt mechanism of claim 1 including a backing plate positioned along a face of said belt opposite said braking member.

4. The safety belt mechanism of claim 1 including disabling means for retracting said braking member from engagement with said belt face and means responsive to a rapid change in velocity of said vehicle for deactuating said disabling means.

5. The safety belt mechanism of claim 4 wherein said disabling means comprises a solenoid including an armature connected to said braking member to retract said braking member upon energization of said solenoid and said velocity change responsive means comprises an inertia switch connected in series between said solenoid and a source of current.

6. The safety belt mechanism of claim 1 wherein the radius of curvature of said brake face relative to said transverse axis decreases in the direction of advance of said belt.

7. The safety belt mechanism of claim 1 wherein said predetermined value is between 300 and 3,000 kilograms.

* * * * *